United States Patent [19]

Ushiki et al.

[11] Patent Number: 5,197,022
[45] Date of Patent: Mar. 23, 1993

[54] OVERFLOW DETECTION CALCULATOR AND METHOD OF OVERFLOW DETERMINATION

[75] Inventors: Hiroshi Ushiki, Hiratsuka; Tetsuaki Iwasaki, Yokohama; Akira Masuda, Tokyo, all of Japan

[73] Assignee: Kabushiki Kaisha Toshiba, Kawasaki, Japan

[21] Appl. No.: 574,733

[22] Filed: Aug. 30, 1990

[30] Foreign Application Priority Data

Aug. 30, 1989 [JP] Japan .................................. 221717

[51] Int. Cl.⁵ .............................................. G06F 7/38
[52] U.S. Cl. .................................. 364/745; 364/736.5
[58] Field of Search ........................ 364/745, 736.5, 737

[56] References Cited

U.S. PATENT DOCUMENTS

| | | | |
|---|---|---|---|
| 3,812,470 | 5/1974 | Murtha et al. ........................ | 364/745 |
| 4,223,389 | 9/1980 | Amada et al. ........................ | 364/745 |
| 4,347,579 | 8/1982 | Matsuyama ..................... | 364/709.01 |
| 4,700,324 | 10/1987 | Doi et al. ............................ | 364/745 |
| 4,817,047 | 3/1989 | Nishitani et al. ..................... | 364/745 |
| 4,821,228 | 4/1989 | Wickes et al. ........................ | 364/706 |
| 4,891,780 | 1/1990 | Miyoshi .............................. | 364/745 |
| 4,945,507 | 7/1990 | Ishida et al. ........................ | 364/736.5 |
| 4,961,161 | 10/1990 | Kojima ............................. | 364/736.5 |

FOREIGN PATENT DOCUMENTS

0029706A1 6/1981 European Pat. Off. .
0136834A3 4/1985 European Pat. Off. .
2103399A 7/1982 United Kingdom .

OTHER PUBLICATIONS

"Announcing the SR-50 super slide-rule calculator from Texas Instruments" Texas Instruments Inc. 4 page brochure Sep. 3, 1974.

*Primary Examiner*—David H. Malzahn
*Attorney, Agent, or Firm*—Foley & Lardner

[57] ABSTRACT

A calculation method suitable for use in statistics calculations and a calculator using the method are disclosed. The method has the steps of storing a memory content from a memory in a first register of a calculation circuit; storing input data in a second register of the calculation circuit; performing a calculation on the contents of the first register and the second register, and storing the result of the calculation in the first register; determining that the calculation result stored in the first register has not overflowed; transferring the content of said first register to the memory and overwriting the memory content therewith, if the calculation result has not overflowed after the processes have been repeated a specified number of times. The calculator has an input section for inputting data; a calculation section for performing a specified calculation on the data; an overflow determination section for determining whether or not a calculation result that is the result of the calculation has overflowed; a calculation totalling section for determining whether or not the calculation has been performed a specified number of times; and a memory section for storing the calculation result obtained by the calculation means, if the calculation totalling means has determined that the calculation has been performed the specified number of times.

5 Claims, 2 Drawing Sheets

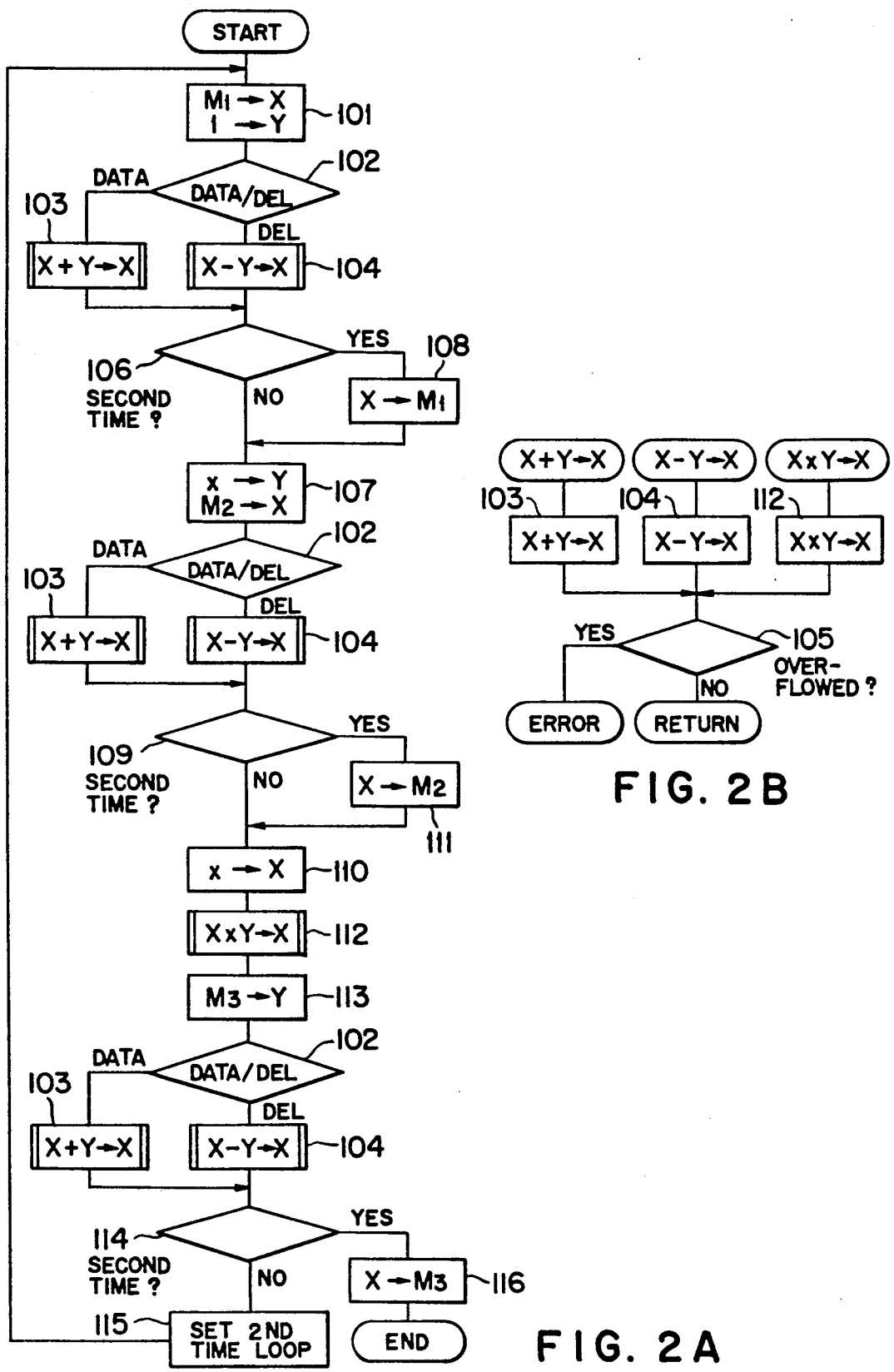

OVERFLOW DETECTION CALCULATOR AND METHOD OF OVERFLOW DETERMINATION

BACKGROUND OF THE INVENTION

The present invention relates to a calculation method and a calculator that uses the same, in particular to a calculation method suitable for use in statistics calculations.

With a calculator designed according to conventional techniques for statistics calculations, if an overflow were to occur during the process of statistics calculations involving calculating the sum of input data samples ($\Sigma x$), the sum of the squares of the data samples ($\Sigma x^2$), and the total number of data samples (n) as data is input in continuous sequence, data that has been accumulated in a statistics storage memory would be destroyed. Therefore, it is usual to provide a statistics save memory as means for preserving the data that has been accumulated in the statistics storage memory, in case an overflow occurs. In other words, this statistics save memory preserves data that is accumulated in the statistics storage memory and that indicates the status immediately before each calculation is performed. In this case, some of the limited memory capacity of the calculator is used as statistics save memory, causing various problems such as reduced calculation ability during statistics calculations.

SUMMARY OF THE INVENTION

In view of the above problem, it is an object of the present invention to provide a calculation method and a calculator using that method which removes the need for the provision of a statistics save memory and which is also able to preserve data stored in a statics storage memory if an overflow should occur during statistics calculations.

According to one aspect of the present invention, there is provided a calculation method comprising the steps of storing a memory content from a memory in a first register of a calculation circuit; storing input data in a second register of the calculation circuit; performing a calculation on the contents of the first register and the second register, and storing the result of the calculation in the first register; determining that the calculation result stored in the first register has not overflowed; and transferring the content of the first register to the memory and overwriting the memory content therewith, if the calculation result has not overflowed after the processes have been repeated a specified number of times.

According to another aspect of the present invention, there is provided a calculator comprising: an input means for inputting data; a calculation means for performing a specified calculation on the data; an overflow determination means for determining whether or not a calculation result that is the result of the calculation has overflowed; a calculation totalling means for determining whether or not the calculation has been performed a specified number of times; and a memory means for storing the calculation result obtained by the calculation means, if the calculation totalling means has determined that the calculation has been performed the specified number of times.

According to the present invention, a decision is made as to whether or not a calculation result has overflowed. If no overflow has occurred, the same calculation is performed a specified number of times, and the calculation result is stored in memory, removing the need for statistics save memory. If an overflow occurs during the calculation, the data stored in memory can be preserved.

BRIEF DESCRIPTION OF THE DRAWINGS

IN the accompanying drawings,

FIG. 1 is a block diagram of a calculator of an embodiment of the present invention and FIGS. 2A and 2B are flow charts of the operation of the embodiment of the present invention.

DESCRIPTION OF THE PREFERRED EMBODIMENT

Figure 1:
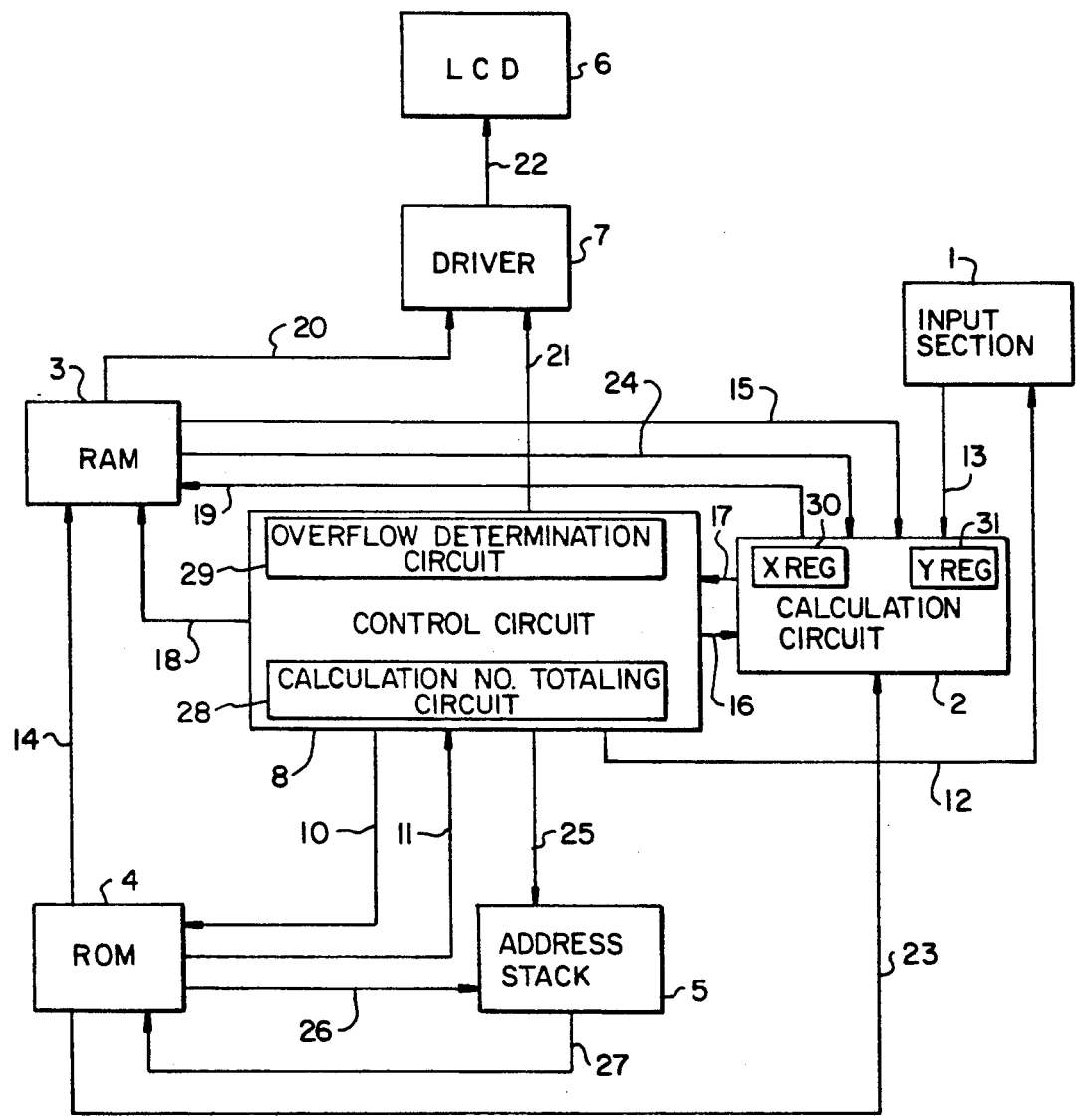

A calculator in accordance with an embodiment of the present invention will now be described with reference to FIGS. 1 and 2A/2B. FIG. 1 is a block diagram of the structure of a calculator that embodies the present invention.

The calculator of the present invention is provided with an input section 1 that inputs data from outside, a calculation circuit 2 that performs specified calculations on the input data, a RAM 3 that stores calculation results obtained by the calculation circuit 2, a ROM 4 that contains a program, an address stack 5 that stores addresses of programmed instructions in accordance with the program stored in the ROM 4, an LCD 6 that displays input data and calculation results, a driver 7 that converts signals for the display of input data and calculation results by the LCD 6, and a control circuit 8 that controls the operations of each of the input section 1, the calculation circuit 2, the RAM 3, the ROM 4, the address stack 5, and the driver 7.

The calculator is first put into an input data wait status by a control signal 10 from the control circuit 8, in accordance with the program stored in the ROM 4 whose read-out is controlled. This status is then posted to the control circuit 8 by a control signal 11, and a control signal 12 controls the input section 1. Next, data is input to the input section 1, and the input data is read into the calculation circuit 2 by a control signal 13. In accordance with a control signal 15, the calculation circuit 2 reads address data from the RAM 3, this address data being specified from the ROM 4 by a control signal 14. Next, the calculation circuit 2 follows signals received from the control circuit 8 in accordance with a control signal 16, to perform the desired calculation. The calculation results obtained by the calculation circuit 2 are transferred to the control circuit 8 by a control signal 17. The calculation number totaling circuit 28 in the control circuit 8 detects the number of calculations performed. The overflow determination circuit 29 in the control circuit 8 detects the presence or absence of an overflow in the calculation results provided by the calculation circuit 2, as described below. Next, I/O operations of the RAM 3 are controlled by a control signal 18 to write the calculation results into the RAM 3 by a control signal 19. Note that if an overflow has occurred, the control signal 19 becomes a write inhibit signal. Data that is desired to be displayed is then transferred from the RAM 3 by a control signal 20 to the drive 7, which is controlled by a control signal 21 received from the control circuit 8. The driver transfers a display waveform to the LCD 6 by a control signal 22, to display the calculation results on the LCD 6.

The calculation circuit 2 inputs data stored in the ROM 4 by a control signal 23, or inputs data stored in the RAM 3 by a control signal 24.

The address stack 5 is controlled by a control signal 25 received from the control circuit 8 to store and call return addresses when CALL and RETURN instructions of the program stored in the ROM 4 are executed. It stores return addresses for CALL instruction in accordance with a control signal 26 received from the ROM 4, and calls return addresses for RETURN instructions as a control signal 27 to the ROM 4.

Flow charts of the operations of this embodiment of the present invention are shown in FIGS. 2A and 2B. In this case, the calculator is to obtain the total number of input data samples (n), the sum of the data samples ($\Sigma x$), and the sum of the squares of the data samples ($\Sigma x^2$), in a statistics calculation mode.

First, in a step 101, the content of a memory $M_1$ provided in the RAM 3 is stored in an X register 30 of the calculation circuit 2 and 1 is stored in a Y register 31 of the calculation circuit 2. In this case, the content of the memory $M_1$ represents the total number of input data samples, and its initial value is 0. Next, in a step 102, a decision is made as to whether input data is DATA or DEL. If this input data is DATA, the flow proceeds to a step 103; if it is DEL, the flow proceeds to a step 104. In step 103, the values of the X register and the Y register are added, and the result is stored in the X register. Next, in a step 105, a decision is made as to whether or not the value in the X register has overflowed. If it is determined that a result overflow has occurred, memory contents are not overwritten; ERROR is displayed instead. If no overflow has occurred, control returns to a step 106. In step 104 (when the data is DEL), the value in the Y register is subtracted from the value in the X register, and the result is stored in the X register. The next operation is that of step 105, in the same way as that described above. In step 106, a decision is made as to whether or not this is the second time that the above sequence of operations has been performed. If it is the first time, the flow proceeds to a step 107; if it is the second time, the flow proceeds to a step 108. In step 108, the value in the X register is stored in a memory $M_1$ and the flow proceeds to step 107. In step 107, the input data value x is stored in the Y register, and the content of the memory $M_2$ provided in the RAM 3 is stored in the X register. In this case, the content of the memory $M_2$ represents the sum of the data samples ($\Sigma x$), and its initial value is 0. Step 102, step 103, step 104, and step 105 are then performed in the same way as described above. At this point, if no overflow is detected in step 105, control returns and the flow proceeds to a step 109. In step 109, a decision is made as to whether or not this is the second time that the above sequence of operations has been performed. If it is the first time, the flow proceeds to a step 110; if it is the second time, the flow proceeds to a step 111. In step 111, the value in the X register is stored in memory $M_2$ and the flow proceeds to step 110. In step 110, the input data is stored in the X register. Next, in a step 112, the value in the X register is multiplied by the value in the Y register, and the result is stored in the X register. In step 105, the same operation as that described above is performed, but, if no overflow has occurred, when control returns the flow proceeds to a step 113. In step 113, the content of a memory $M_3$ provided in the RAM 3 is stored in the Y register. In this case, the content of the memory $M_3$ represents the sum of the squares of the data samples ($\Sigma x^2$), and its initial value is 0. Step 102, step 103, step 104, and step 105 are then performed in the same way as described above. At this point, if no overflow is detected in step 105, the flow proceeds to a step 114. In step 114, a decision is made as to whether or not this is the second time that the above sequence of operations (LOOP) has been performed. If it is the first time, the flow proceeds to a step 115; if it is the second time, the flow proceeds to a step 116. In step 115, the sequence of operations so far is set to be the second time this sequence has been performed, and the flow returns to step 101. In step 116, the value in the X register is stored in the memory $M_3$ and the calculator waits for the next input data.

In the calculator described above, if none of the results of the total number of input data samples (n), the sum of the data samples ($\Sigma x$), and the sum of the squares of the data samples ($\Sigma x^2$) overflows during the calculation, those results are stored in memory, removing the need for the provision of a special save memory. If an overflow does occur during the calculation, the data stored in memory can be preserved. This method is particularly effective for statistics calculations in which a number of different calculations are performed.

In, the above-described embodiment, each of the calculations of the total number of input data samples (n), the sum of the data samples ($\Sigma x$), and the sum of the squares of the data samples ($\Sigma x^2$) is done once, then a decision is made to all the calculation results as to whether or not an overflow has occurred. Subsequently, if none of the calculation results has overflowed, all the calculations are performed again, and those results are stored in memory. However, note that if the decision as to whether or not an overflow has occurred is performed on the basis of the result of the last calculation (in this embodiment, the sum of the squares of the data samples ($\Sigma x^2$) which generates the largest quantity of data) in the first round of calculations, and it is determined that no overflow has occurred, all the results can be stored in memory as they are. In this case, there is no need to perform the second round of calculations because the first round of calculations has provided calculation results stored in memory. This has the effect of increasing calculation speed and simplifying the program.

Note that in the above-described embodiment the entire group of calculations is repeated in two calculation loops, but the present invention is not limited to two loops; the calculations can be repeated for any desired integral number of loops greater than or equal to two.

What is claimed is:

1. A calculator comprising:
   input means for inputting data;
   calculation mans for performing a predetermined number of a specified calculation on said data;
   overflow determination means for determining whether or not a calculation result that is the result of said specified calculation has overflowed;
   calculation number totalling means for totalling the number of calculations to determine whether or not said calculation has been performed said predetermined number of times;
   memory means for storing said calculation result obtained by said calculation means; and
   control means for controlling transfer of said calculation result to said memory means wherein said calculation result is transferred to said memory means if the number obtained by said calculation totalling means has reached said predetermined number and said calculation result has not overflowed, and wherein said calculation result is prohibited from being transferred to said memory means if the number obtained by said calculation totalling means has not reached said predetermined number or if said calculation result has overflowed.

2. A calculator according to claim 1, further comprising error display means for displaying an error indication if said overflow determination means determines that an overflow has occurred.

3. A method comprising:
a first step of storing a memory content from a memory in a first register of a calculation circuit;
a second step of storing input data in a second register of said calculation circuit;
a third step of performing a calculation on the contents of said first register and said second register;
a fourth step of storing the result of said calculation in said first register;
a fifth step of determining whether said calculation result stored in said first register has overflowed or not;
a sixth step of repeating said first, second, third, fourth, and fifth steps a predetermined number of times, as long as said first register has not overflowed; and
a seventh step of transferring the content of said first register to said memory and overwriting said memory content therewith in the final time of said predetermined number of times.

4. A method according to claim 3, wherein said third step comprises summation.

5. A method according to claim 3, wherein said predetermined number is two.

* * * * *